United States Patent [19]

Seigneurin

[11] Patent Number: 5,055,281

[45] Date of Patent: * Oct. 8, 1991

[54] PROCESS FOR THE PREPARATION OF CALCIUM FLUOSILICATE AS A RAW MATERIAL FOR OBTAINING CALCIUM FLUORIDE AND PURE FLUOSILICIC ACID

[75] Inventor: Laurent Seigneurin, Salindres, France

[73] Assignee: Aluminum Pechiney, France

[*] Notice: The portion of the term of this patent subsequent to Nov. 8, 2006 has been disclaimed.

[21] Appl. No.: 80,228

[22] Filed: Jul. 27, 1987

Related U.S. Application Data

[63] Continuation of Ser. No. 888,800, Jul. 23, 1986, abandoned.

[30] Foreign Application Priority Data

Jul. 26, 1985 [FR] France .................... 85 11919

[51] Int. Cl.$^5$ .................. C01B 33/24; C01B 33/08; C01F 1/00; C01F 5/06
[52] U.S. Cl. ..................... 423/331; 423/178; 423/341
[58] Field of Search ............ 423/331, 178, 341

[56] References Cited

U.S. PATENT DOCUMENTS

| | | | |
|---|---|---|---|
| 2,780,523 | 2/1957 | Glass | 423/490 |
| 4,765,772 | 8/1988 | Benedetti et al. | 404/77 |

FOREIGN PATENT DOCUMENTS

| | | |
|---|---|---|
| 0132202 | 1/1985 | European Pat. Off. |
| 0278679 | 8/1988 | European Pat. Off. |
| 560594 | 10/1932 | Fed. Rep. of Germany |
| 2628325 | 1/1978 | Fed. Rep. of Germany |
| WO-A-0602963 | 5/1986 | PCT Int'l Appl. |

OTHER PUBLICATIONS

Inorganic and Theoretical Chemistry, vol. VI, Mellor, 1947, pp. 951–952.
Ryss, The Chemistry of Flourine and its Inorganic Compounds–Part I, p. 416.

Primary Examiner—John Doll
Assistant Examiner—Lori S. Freeman
Attorney, Agent, or Firm—Jones, Day, Reavis & Pogue

[57] ABSTRACT

Process for the production of anhydrous calcium fluosilicate from anhydrous calcium chloride and impure fluosilicic acid solution, a by-product of the acid treatment of phosphorus ores containing fluorine, characterized in that a calcium fluosilicate dihydrate is precipitated at low temperature and quantitatively by suitable adjustment of the fluosilicic acid concentration and the molar ratio $CaCl_2/H_2SiF_6$ and that after filtration, washing and drying of the precipitate, an anhydrous calcium fluosilicate which can be easily decomposed by heat treatment is obtained to restore calcium fluoride and silicon tetrafluoride suitable for the manufacture of pure hydrofluoric acid and fluosilicic acid.

For gravimetric concentrations of $H_2SiF_6 > 25\%$ and molar concentration ratios $CaCl_2/H_2SiF_6$ between 2 and 5, the yields of the anhydrous calcium fluosilicate obtained are greater than 94%.

8 Claims, 1 Drawing Sheet

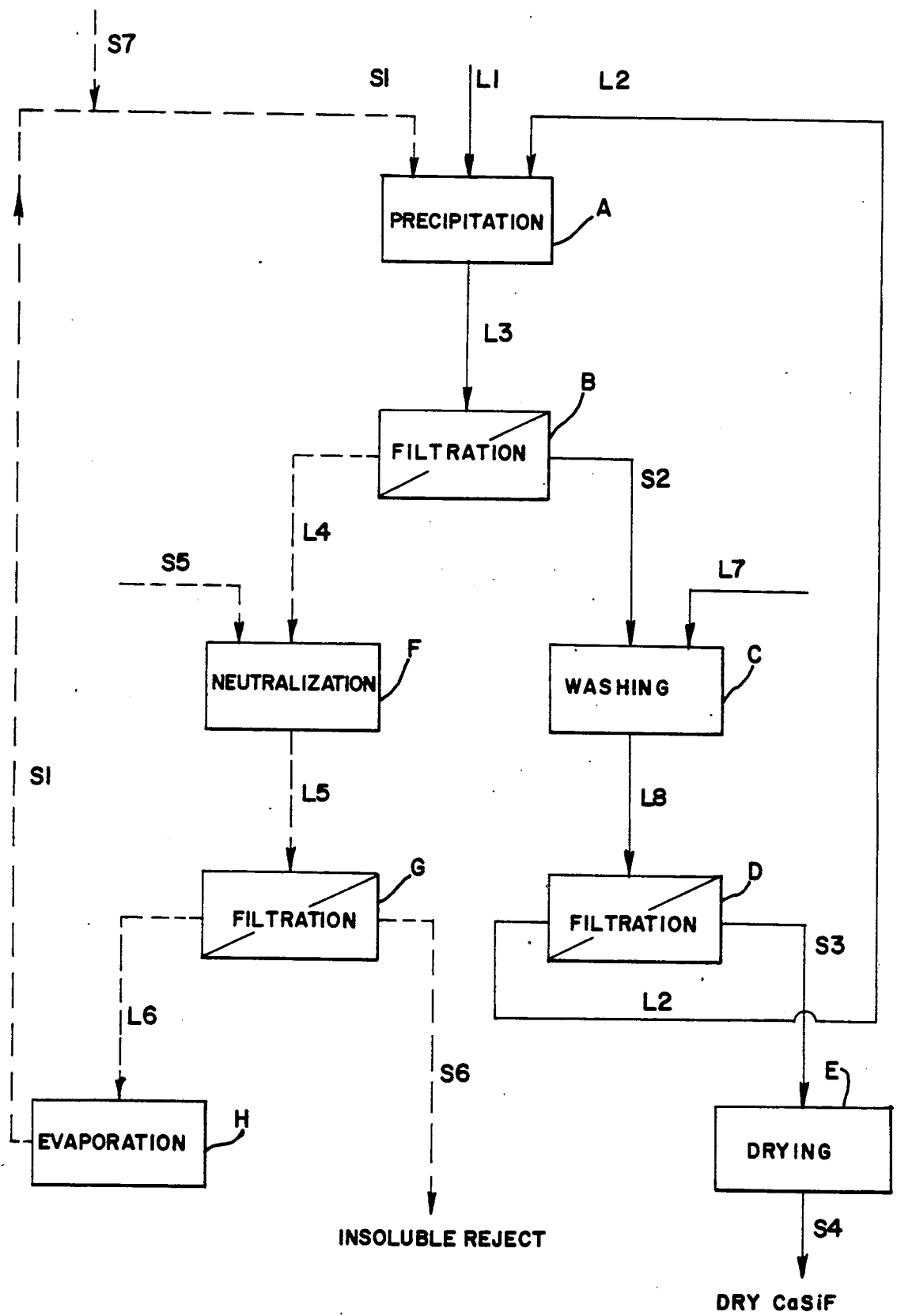

PROCESS FOR THE PREPARATION OF CALCIUM FLUOSILICATE AS A RAW MATERIAL FOR OBTAINING CALCIUM FLUORIDE AND PURE FLUOSILICIC ACID

This application is a continuation of application Ser. No. 888,800 filed July 23, 1986, now abandoned.

TECHNICAL FIELD

The invention relates to a process for the preparation of calcium fluosilicate from impure fluosilicic acid solutions, especially originating from acid treatment of phosphorus ores.

STATE OF THE ART—PRIOR ART

During the production of phosphoric acid and superphosphates, the fertilizer industry generates gaseous fluorinated compounds which can be collected in the form of fluosilicic acid.

Insofar as it is sufficiently purified, especially after the removal of the phosphorus-containing impurities which it may contain, this by-product forms an appreciable source of fluorine for industries which use fluorinated products, and especially the aluminum industry with fluxes based on aluminum trifluoride and cryolite. However, if the purified fluosilicic acid can be used directly, this involves the availability of means for the production of the desired fluorinated derivative, generally in the liquid phase, at the production site.

In order to overcome this constraint, a certain number of processes which are well-known to the man skilled in the art, indicate how to transform the impure fluosilicic compound, which is to say to isolate, in order to treat it later, in a way aimed either at producing hydrofluoric acid and/or fluosilicic acid, or at obtaining a mixed metal fluoride of the chiolite or the synthetic cryolite type directly. The intermediate compounds which are chosen for this purpose are generally alkali metal fluosilicates which precipitate directly in the anhydrous state and quantitatively. Sodium fluosilicate is the most economical to produce by combining sodium chloride with fluosilicic acid according to the reaction:

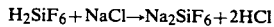

In contrast, it is difficult to decompose sodium fluosilicate into volatile silicon tetrafluoride and sodium fluoride by heat treatment. In fact, this requires operating at temperatures of the order of 700° C., where the pressure of the sodium fluoride vapour is significant.

It is therefore advisable:

either to treat it with a concentrated acid at about 300° C. as described in U.S. Pat. No. 2,832,669, with the disadvantage of introducing another acid into the reaction products, these being hydrofluoric acid and silicon tetrafluoride SiF4.

or to precipitate a mixed fluoride of sodium and aluminum such as chiolite or synthetic cryolite directly by the wet process, using a suspension of trihydrate of alumina (French Patent No. 927,824) or a sodium aluminate solution (U.S. Pat. No. 3,676,061). The disadvantage of these processes is the restriction on the use of sodium fluosilicate solely to the production of fluxes for the manufacture of aluminum metal by electrolysis in the dry way.

PROBLEM POSED

The production of an easily decomposable fluosilicate for restoring the basic fluorine-containing derivatives, namely calcium fluoride and pure fluosilicic acid, therefore constitutes significant progress in that the production of this fluosilicate remains simple and inexpensive.

To this end, the calcium fluosilicate resulting from the reaction of reclaimed fluosilicic acid with a calcium salt such as calcium chloride can, a priori, provide a satisfactory solution to this problem.

In fact, the man skilled in the art encounters a major difficulty with this compound. Unlike alkali metal fluosilicates which precipitate quantitatively, generally in the anhydrous state, calcium fluosilicate which precipitates only in the hydrated state $CaSiF_6.2H_2O$, is very difficult to isolate because of its high solubility in an acid medium and its instability in a neutral or basic medium in which it decomposes into silica and calcium fluoride. According to I. G. RYSS (THE CHEMISTRY OF FLUORINE, AND ITS INORGANIC COMPOUNDS - PART 1), calcium fluosilicate dihydrate maybe isolated by the evaporation-crystallization of a calcium carbonate solution in an excess of fluosilicic acid. The separation of the crystallized salt from the mother-liquors is facilitated by the addition of alcohol or acetone which decreases its solubility. KAZAK and ZYRINA (CHEMICAL ABSTRACTS 1984 101: 154,198) have studied the precipitation of $CaSiF_6.2H_2O$ in a phospho-nitric acid medium during the initial treatment phase of phosphorus ores. All these studies show the difficulty of finding an industrial solution to the problem of extracting calcium fluosilicate, which is primarily related to the problem of its quantitative precipitation.

SUBJECT OF THE INVENTION

Engaged in these observations, the Applicant, in the course of its investigations, has perfected a process for the production of calcium fluosilicate intended, after thermal decomposition, to provide calcium fluoride and silicon tetrafluoride which can be easily converted into pure hydrofluoric acid and fluosilicic acid respectively, starting from the fluosilicic acid liquor obtained as by-product of the acid treatment of phosphorus ores, and characterized in that a fluosilicic acid solution of concentration >10% by weight is brought into contact with calcium chloride in a quantity such that the molar ratio $CaCl_2/H_2SiF_6$ is >1, at a temperature not exceeding 50° C. and that a calcium fluosilicate dihydrate $CaSiF_6.2H_2O$ is precipitated almost quantitatively, which, on drying in the region of 130° C., is converted into anhydrous fluosilicate $CaSiF_6$ which can be easily decomposed in air between 250° C. and 400° C. into solid $CaF_2$, and volatile $SiF_4$, this latter derivative being capable of hydrolysis in the presence of water to give purified fluosilicic acid solution and silica.

The precipitation of $CaSiF_6.2H_2O$ takes place according to the reaction:

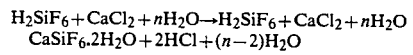

and the addition of an excess of $CaCl_2$ enables the reaction to be shifted in the direction of formation of $CaSiF_6.2H_2O$ which precipitates by supersaturation in the acid medium. The $CaCl_2$ excess measured by the molar ratio $CaCl_2/H_2SiF_6$ is >1. In fact, although the Applicant has confirmed that increasing this molar ratio from 1.5 to 15 makes it possible to improve the yield of precipitation of calcium fluosilicate dihydrate determined by the gravimetric ratio of $CaSiF_6 2H_2O$ actually precipitated to the total quantity employed in the reaction, the latter did not exceed 85% when the fluosilicic acid concentration remained less than 10%. In contrast, at fluosilicic acid concentrations of at least 25%, the precipitation yields reach 90%, and at least 95% with fluosilicic acid concentrations of 30%. This is the case for $CaCl_2$ excesses corresponding to molar ratios of between 2 and 5, as beyond this, the solubility of the $CaCl_2$ in excess becomes the limiting factor. The tables of results below make it possible to ascertain the preponderant and decisive effect of the fluosilicic acid concentration on the yield of precipitation of calcium fluosilicate dihydrate compared to the "mass action" effect of the excess calcium chloride.

TABLE I

| The effect of the molar ratio on the precipitation yield of $CaSiF_6.2H_2O$. | | |
|---|---|---|
| Molar ratio | Precipitation yield % $CaSiF_6.2H_2O$ | |
| $CaCl_2/H_2SiF_6$ | 10% $H_2SiF_6$ | 30% $H_2SiF_6$ |
| 1 | 0 | 78 |
| 1.5 | 0 | 94 |
| 2.5 | 1 | 96 |
| 5 | 77 | $CaSiF_6.2H_2O$ + $CaCl_2$ mixture |
| 8 | 86 | |

TABLE II

| Effect of the fluosilicic acid concentration and of the molar ratio | | |
|---|---|---|
| $H_2SiF_6$ concentration % | Molar ratio $CaCl_2/H_2SiF_6$ | Yield % $CaSiF_6.2H_2O$ |
| 30 | 2.5 | 96 |
| 25 (24.6) | 2.75 | 90 |
| 10 | 8 | 86 |
| 5 | 15 | 65 |

Another favourable effect observed by the Applicant is the removal of more than 90% of the phosphorus-containing impurities, the concentration of which may reach up to 0.1% of phosphorus in the initial fluosilicic acid solution at the calcium fluosilicate dihydrate precipitation stage which makes it possible to ensure a phosphorus content in the anhydrous calcium fluosilicate of less than 100 ppm.

BRIEF DESCRIPTION OF THE DRAWING

The description of the process according to the invention which follows, by means of FIG. 1, shows that the recycling of the intermediate products such as calcium chloride and the water washings into the first stage of the cycle is easy. Under these conditions, the process only uses calcium carbonate and a small amount of hydrochloric acid to produce the anhydrous calcium chloride required for compensating for recycling losses, and it can be used continuously.

DESCRIPTION

In practice, the process according to the invention consists, in a first stage A, in reacting a solution L1 of fluosilicic acid at a minimum concentration of 25% by weight, with anhydrous calcium chloride S1 in a molar ratio $CaCl_2/H_2SiF_6$ of between 1.5 and 5.

In order to ensure the maximum yield from the plant and avoid the discarding of the solutions used for washing the filtered $CaSiF_6.2H_2O$ precipitate, these solutions L2 are added to the first stage A; they may represent 50% of L1 by volume.

After S1, L1 and L2 have been brought into contact and mixed at a temperature not exceeding 35° C., for a period required for the reaction which is of the order of 30 to 60 minutes, the suspension L3 resulting from A is filtered and drained in stage B to separate the liquid phase L4 which consists of the filtrate of the mother liquor and the solid phase S2 which consists of the calcium fluosilicate dihydrate cake, which in a new stage C is washed by mixing with an aqueous solution L7 of 3% strength fluosilicic acid, for a period of approximately 15 to 30 minutes. The slime L8 resulting from C is filtered and drained in step D to separate the solid phase S3 which consists of the washed wet cake of hydrated calcium fluosilicate, and the liquid phase L2 which consists of the washing water which is recycled into the first part of the chain at the initial stage A of calcium fluosilicate precipitation.

The wet hydrated calcium fluosilicate cake S3, after drying in stage E at a temperature of less than 150° C., loses its water of crystallization to give the anhydrous fluosilicate $CaSiF_6$ in S4. This anhydrous calcium fluosilicate may then be easily decomposed in air between 250° and 400° C. to form solid calcium fluoride and gaseous silicon tetrafluoride which hydrolyzes in the presence of water, to give a phosphorusfree fluosilicic acid solution and a precipitate of silica.

The filtrate of the mother liquor L4 resulting from step B, containing the excess calcium chloride and the hydrochloric acid resulting from the precipitation reaction, is treated in a supplementary cycle. After mixing with an excess of calcium carbonate S5 at ambient temperature in step F, to neutralize the free hydrochloric acid contained in L4, the neutralized liquor L5 which results therefrom is filtered in step G to separate the liquid phase L6 which consists of the calcium chloride solution and the solid phase S6 which consists of:
- the excess calcium carbonate
- the calcium fluosilicate fraction solubilized in stage A, carried over in the liquor L4 and precipitated in the form of silica and calcium fluoride in the neutralization step F.
- the major part of the phosphorus-containing impurities contained in the reclaimed fluosilicic acid, which precipitate in the form of calcium phosphate in the neutralization step F.

The solid phase S6 is removed, the liquid phase L6 is evaporated to dryness at stage N at approximately 160° C., and to constant weight, to give anhydrous calcium chloride S1 which is recycled into the first part of the cycle in step A, with an external addition S7, if required, to compensate for losses.

EXAMPLES OF APPLICATION

EXAMPLE 1

188 cm³ of a 30% strength fluosilicic acid solution containing 0.064% phosphorus, this being 240 g of a solution containing 72 g of $H_2SiF_6$ and 0.154 g of phosphorus, are mixed with 95 cm³ of a water of washing from a previous operation, this being approximately 100 g of a 3% strength $H_2SiF_6$ (3 g) solution, in a polyethylene beaker.

Approximately 125 g of anhydrous $CaCl_2$, this being 1.125 mole, which corresponds to a molar ratio $CaCl_2/H_2SiF_6$ of 2.5, are introduced in small amounts over 1 hour, with stirring.

The suspension is cooled to maintain the temperature between 30° and 35° C. At the end of the reaction, the temperature of the solution decreases to stabilize at around 22° C. This is filtered and drained:

weight of the wet cake: 170 g acid mother-liquor filtrate: 240 cm³ (305 g).

After washing the cake by stirring it again in 100 cm³ of 3% strength $H_2SiF_6$ solution for 30 minutes, it is filtered and drained (the water of washing is stored for a new precipitation operation):

weight of the wet washed cake: 145 g.

After drying in an oven at 140° C. to constant weight, dry anhydrous $CaSiF_6$ is obtained:

weight of $CaSiF_6$: 89 g —P content <0.01%

Therefore, for a weight of $CaSiF_6$ employed of 94.8 g, corresponding to a total conversion of 75 g of $H_2SiF_6$ into $CaSif_6$, the yield is: 89/94.8=93.9%.

The 240 cm³ (305 g) of the acid mother-liquor filtrate is neutralized with 70 g of dry $CaCO_3$. After a further filtration, the following are collected:

a) $CaCl_2$ solution: 270 cm³ (360 g), which is evaporated to dryness at 160° C. The weight of dry anhydrous $CaCl_2$ which can be reused is 115 g, which amounts to 115/125=92% of the initial quantity employed, the external addition being only 10 g.

b) an insoluble residue containing excess calcium carbonate, $CaF_2$, $SiO_2$ and phosphorus in the form of phosphate.

EXAMPLE 2

Test of reproducibility, yield, composition

Mass balance of 6 operations carried out using 30% strength $H_2SiF_6$ and containing 0.064% phosphorus under the same conditions as in Example 1 and additionally performing the thermal decomposition of $CaSiF_6$.

total $H_2SiF_6$ employed: 450 g (0.5×6=3 moles, or 432 g+6 washings at a rate of 3 g of $H_2SiF_6$ per washing, which amounts to 18 g).

weight of $CaSiF_6$ corresponding to this implementation: 568.75 g weight of $CaSiF_6$ actually obtained: 536 g containing 0.048 g of phosphorus mean yield 536/568.75=94.2% phosphorus content <0.01% thermal decomposition of the 536 g of $CaSiF_6$ at 400° C.: 53.8% loss corresponding to the loss of $SiF_4$. The deviation from the theoretical loss of 56.7% is explained by the presence of a certain amount of residual silica in $CaF_2$.

Phosphorus content in $CaF_2$<0.02%

Tests carried out on the insoluble residues after neutralization, originating from 6 successive operations gave the following results:

total dry weight: 128 g

Fluorine content: 17% which amounts to 21.8 g, or 0.191 mole of $H_2SiF_6$ for 3.125 moles (450 g $H_2SiF_6$) employed at the start, which amounts to a loss of 6.1% of fluorine, which crosschecks well with the yield of calcium fluosilicate which is in the region of 94%.

Phosphorus content: 0.60% which amounts to 0.77 g.

Phosphorus contained in the final mother liquor: 0.098 g

Phosphorus contained in the fluosilicate precipitated: 0.048 g.

This amounts to a total of 0.916 g of phosphorus which is in good agreement with the phosphorus contained in the 30% strength fluosilicic acid solution, namely, 6×0.154=0.924 g.

I claim:

1. A process for the production of anhydrous calcium fluosilicate from fluosilicic acid solution, a by-product of the acid treatment of phosphorous ores containing fluorine, comprising the steps of:

(a) forming a suspension comprising a liquid phase and a precipitate of calcium fluosilicate dihydrate by mixing, at a temperature of less than 50° C., (1) an aqueous solution of fluosilicic acid having a gravimetric concentration of $H_2SiF_6$ greater than 10% with (2) anhydrous calcium chloride in a molar ratio $CaCl_2/H_2SiF_6$ of between 1.5 and 5, and with (3) a dilution water having a gravimetric concentration of $H_2SiF_6$ of between 0 and 10%, said dilution water not exceeding 60% by volume of said aqueous solution of fluosilicic acid;

(b) filtering and draining the suspension to separate the calcium fluosilicate dihydrate precipitate from the liquid phase;

(c) washing the calcium fluosilicate dihydrate precipitate by mixing the precipitate with an aqueous solution of fluosilicic acid having a gravimetric concentration of $H_2SiF_6$ of between 2 and 4%;

(d) filtering the resulting medium comprising the calcium fluosilicate dihydrate precipitate and the washing solution to separate the precipitate;

(e) drying the dehydrating the calcium fluosilicate between 120° C. and 140° C. to constant weight to obtain an anhydrous calcium fluosilicate having a gravimetric phosphorous content of less than 100 ppm.

2. Process according to claim 1 wherein the gravimetric concentration of the aqueous solution of fluosilicic acid is greater than 20%.

3. Process according to claim 1, wherein the temperature of the mixing in step (a) is between 15° and 30° C.

4. A process for producing calcium fluoride and silicon tetrafluoride from anhydrous calcium fluosilicate as produced by claim 1, wherein said anhydrous calcium fluosilicate obtained after drying is decomposed in air between 300° and 400° C. to give calcium fluoride an silicon tetrafluoride.

5. Process according to claim 1, wherein the liquid phase from step (b) is neutralized with an excess of calcium carbonate to give a liquor, and said neutralized liquor is filtered to separate a liquid phase comprising a calcium chloride solution from a solid phase which consists of the excess calcium carbonate, calcium fluoride, silica and insoluble phosphorous-containing compounds.

6. Process according to claim 5, wherein the separated calcium chloride solution is evaporated to dryness at a temperature of about 160° C. and to constant weight to obtain anhydrous calcium chloride, and said anhydrous calcium chloride is recycled into step (a).

7. Process according to claim 1, wherein the precipitating, separating, washing, filtering and drying steps are carried out in continuous production cycles.

8. Process according to claim 1, wherein the dilution water has a gravimetric $H_2SiF_6$ concentration of between 2 and 5%.

* * * * *